United States Patent [19]

Lorenz et al.

[11] Patent Number: 4,752,318

[45] Date of Patent: Jun. 21, 1988

[54] AQUEOUS SYSTEM TREATED WITH A BIOCIDE

[75] Inventors: Joachim Lorenz; Reinhardt Grade, both of Bensheim, Fed. Rep. of Germany

[73] Assignee: Ciba-Geigy Corporation, Ardsley, N.Y.

[21] Appl. No.: 865,719

[22] Filed: May 22, 1986

[30] Foreign Application Priority Data

May 28, 1985 [CH] Switzerland ............... 2244/85

[51] Int. Cl.$^4$ ........................... A01N 33/04
[52] U.S. Cl. ........................... 71/67; 514/643
[58] Field of Search ............... 71/67; 514/643

[56] References Cited

U.S. PATENT DOCUMENTS 4,018,592  4/1977  Buckman et al.

FOREIGN PATENT DOCUMENTS 1546809  5/1979  United Kingdom .

OTHER PUBLICATIONS

M. H. Angele, Seifen, Ole, Fette, Wachse 101, 273 (1975).
H. D. Held, Kühlwasser, Vulkan-Verlag, Essen, 1984, pp. 212–217.
Ullmanns Encyclopedia, pp. 41–58.

Primary Examiner—Catherine L. Mills
Attorney, Agent, or Firm—Edward McC. Roberts; Luther A. R. Hall

[57] ABSTRACT

Special quaternary ammonium compounds are suitable for controlling bacteria, algae and other micro-organisms in cooling water circulation systems, swimming pools and industrial water tanks.

6 Claims, No Drawings

AQUEOUS SYSTEM TREATED WITH A BIOCIDE

The present invention relates to an aqueous system containing a special polymeric quaternary ammonium compound, said aqueous system being a cooling cycle, a swimming pool or an industrial water tank, and to a method of controlling bacteria, algae and other micro-organisms in cooling water circulation systems, swimming pools and industrial water tanks.

For more than 30 years it has been known that quaternary ammonium compounds have bactericidal properties. The biocidal activity of the compounds is explained by their surface-active properties (Angele, M. H., "Seife, Oele, Fette, Wachse" 101, p. 274, 1975). In common with most surface active substances, quaternary ammonium compounds also have a certain foaming capacity. This foaming militates against the use of biocides in cooling water circulation systems, as excess foaming may occur in the cup of the cooling tower (Held, H. D., "Kühlwasser", Vulkan-Verlag, Essen 1984, p. 212).

The frequent necessary addition of antifoams for the above mentioned utility has environmental and economic disadvantages, whereas a reduction in the concentration of biocide results in a reliable activity against the growth of bacteria and other micro-organisms being no longer guaranteed. Furthermore, the conventional biocides employed in water treatment must subsequently be added at relatively short intervals in order to keep the rapid further increase in the microbial content under control.

Polymeric quaternary ammonium compounds and the preferred use thereof, inter alia, as dyeing assistants for textiles are disclosed in German Offenlegungsschrift No. 2 657 582. In addition to other utilities, such as precipitants for effluent purification and antistatic agents for textiles, the antimicrobial activity against three strains of bacteria is disclosed (Example 23). As has been mentioned above, the antimicrobial activity of quaternary ammonium compounds has long been known.

It was not to be expected that some of the compounds disclosed in this German Offenlegungsschrift would have excellent biological properties without foaming and would therefore be suitable for controlling micro-organisms in cooling water circulation systems, swimming pools and industrial water tanks.

It is also extremely surprising that these special ammonium compounds have a long-lasting biocidal activity. The use of these compounds for controlling harmful micro-organisms thus entails not only ease of handling but also a low consumption of biocide and hence less risk of environmental pollution.

The present invention relates to an aqueous system containing a polymeric quaternary ammonium salt of the general formula

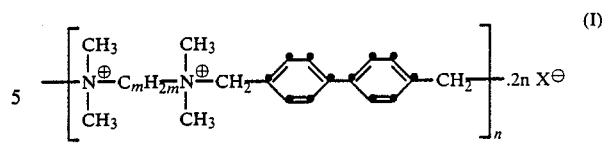

wherein n is an integer from 4 to 60, m is an integer from 2 to 20, and $X^\ominus$ is fluoride, chloride, bromide or iodide, said system being a cooling water circulation system, an industrial water tank or a swimming pool.

Preferably the aqueous system contains a compound of formula I, wherein m is 3 to 12.

More preferably the aqueous system contains a compound of formula I, wherein m is 6 and n is an integer from 10 to 15.

Still more preferably the aqueous system contains a compound of formula I, wherein n is an integer from 6 to 20.

First and foremost, the aqueous system contains a compound of formula I, wherein n is 10 to 15. The aqueous system also preferably contains a compound of formula I, wherein $X^\ominus$ is chloride.

The cooling water circulation systems of e.g. power stations, chemical manufacturing plants, heat pumps or air-conditioning plants constitute the principal field of use of the present invention. The addition of the biocide of formula I depends on the contamination and dilution in the cooling circuit. Depending on the nature of the cooling circuit, the addition of biocide will be made every 2 to 4 weeks.

Especially for the control of harmful organisms in cooling water, further conventional additives can be added, e.g. corrosion inhibitors, scale inhibitors, biodispersants, water softening agents, masking agents, i.e. polymeric phosphites, phosphates, amides of phosphoric acid, phosphonic acids, polymeric carboxylic acids, e.g. polyacrylic acid or polymaleic acid and the anhydrides and salts thereof, and other additives. Water tanks, e.g. emergency water reservoirs, rain water tanks or storage tanks for non-potable water constitute a further field of use of the invention.

Another principle utility of this invention is the control of harmful organisms in swimming pools. For this utility the biocide of formula I will be added to the water at 2 week intervals. For industrial water tanks it will suffice to add the biocide every 2 to 4 weeks.

Depending on the envisaged end use, addition of the biocide will be made in concentrations which are known to the person skilled in the art. It is preferred to add the biocide of the formula I in concentrations of 1 to 100 ppm, preferably of 5 to 40 ppm.

The invention further relates to a method of controlling microorganisms in cooling water circulation systems, industrial water tanks and swimming pools using the polymeric ammonium salts of formula I.

The ammonium compounds of formula I may be prepared according to the method described in German Offenlegungsschrift No. 2 657 582.

The long-lasting biocidal activity of the following compounds (n=4–60):

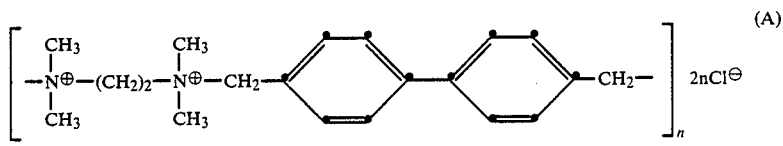

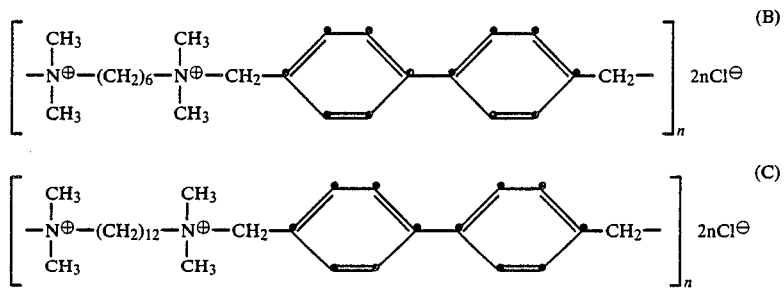

is illustrated in Examples 1 to 5:

EXAMPLE 1

The cooling water circulation system, which is in the open air and thus exposed to natural solar radiation, incursion of dust and atmospheric influences, consists of:

(a) a plastic barrel with a volume of 113 l and overflow,
(b) a pump (21 l/min at 3 m delivery head of water),
(c) a cooling tower with Oregon sapwood, Oregon heartwood, oak, pine, asbestos cement and PVC boards.

The supply of fresh water is adjusted such that spray and evaporation loss is compensated and the biocide of formula I is diluted over 24 hours to half its initial concentration.

The cooling circuit is infected by natural incursion of dust and not by controlled inoculation. To prevent formation of slime and algal growth, the cooling circuit is treated initially twice weekly, and then at increasingly longer intervals, with 10 ppm of compound B.

The experiment is evaluated by determining the germ titre by dilution and streaking out directly before the addition of biocide and 3 hours afterwards, as well as by visual observation of the growth on the boards.

| Time | Cooling water without biocide germ count/ml | Cooling water containing compound B germ count/ml | Addition |
|---|---|---|---|
| 0 | $2 \times 10^3$ | $1.5 \times 10^4$ | + |
| 3 h | | $8.1 \times 10^1$ | |
| 3 days | $1.1 \times 10^3$ | 9 | |
| 7 days | $1.1 \times 10^3$ | $1 \times 10^1$ | + |
| 7 days + 3 h | | 0 | |
| 10 days | | $2.7 \times 10^1$ | + |
| 10 days + 3 h | | 0 | |
| 14 days | $3 \times 10^4$ | 0 | + |
| 14 days + 3 h | | 0 | |
| 17 days | | 0 | |
| 21 days | $3.7 \times 10^5$ | $4.9 \times 10^1$ | + |
| 21 days + 3 h | | $3.1 \times 10^1$ | |
| 30 days | | 0 | + |
| 30 days + 3 h | | 0 | |
| 35 days | $7 \times 10^3$ | 0 | + |
| 35 days + 3 h | | 0 | |
| 38 days | | 0 | |
| 41 days | $6.7 \times 10^2$ | 0 | |
| 45 days | | $7.5 \times 10^2$ | |
| 49 days | $1.5 \times 10^4$ | $6.5 \times 10^1$ | + |
| 49 days + 3 h | | 0 | |
| 52 days | | 0 | |
| 56 days | $7 \times 10^3$ | 0 | |
| 59 days | | 0 | |
| 63 days | $4.3 \times 10^2$ | 0 | |
| 66 days | | 0 | |
| 70 days | $5.3 \times 10^2$ | 0 | |

As the half-life period of the cooling circuit is 24 hours, after addition the biocide is diluted, over 2 days, such that the harmful organisms may grow again. However, it is evident from the Table that the germ count during the entire duration of the experiment is reduced to virtually zero. During the entire duration of the experiment no algae or bacterial slime can be observed on the wooden components.

EXAMPLE 2

The cooling circuit described in Example 1 is used for this experiment, but differs in that it is located indoors, spray loss is prevented by a plastic coating, and there is no purge. The cooling water is treated at the start of the experiment, and again after 8 days, with 300 ppm of compound B. As the following Table shows, two additions suffice to keep the cooling water virtually sterile over a period of 3 months.

| Time | Cooling water without biocide germ count/ml | Cooling water containing compound B germ count/ml | Addition |
|---|---|---|---|
| 0 | $1.8 \times 10^4$ | $6.2 \times 10^5$ | + |
| 3h | | 0 | |
| 1 day | | 0 | |
| 4 days | $9.9 \times 10^3$ | $4 \times 10^1$ | |
| 6 days | $9.8 \times 10^3$ | 0 | |
| 8 days | $7.2 \times 10^4$ | $5.4 \times 10^1$ | + |
| 8 days + 3 h | | 0 | |
| 11 days | $2.3 \times 10^4$ | 0 | |
| 13 days | $6.0 \times 10^3$ | 0 | |
| 19 days | $8.5 \times 10^2$ | $3 \times 10^1$ | |
| 41 days | $1.1 \times 10^3$ | $4 \times 10^1$ | |
| 49 days | | $1.3 \times 10^2$ | |
| 55 days | $1.7 \times 10^3$ | 0 | |
| 74 days | | 0 | |
| 81 days | | 0 | |
| 88 days | | 0 | |
| 96 days | | 0 | |
| 103 days | | 0 | |

EXAMPLE 3

The procedure of Example 2 is repeated. The cooling circuit is treated at the start of the experiment with 30 ppm of the biocide of formula I.

The following Table shows the biological activity expressed in the logarithm of the reduction in germs as a function of the time ($KR_t$).

| | | Biological activity $KR_t$ | | |
|---|---|---|---|---|
| | | cooling water containing a biocide of formula I | | |
| Time/Days | Control | Compound A | Compound B | Compound C |
| 1 | −0.34 | 0.39 | 0.54 | 3.15 |

-continued

| | | Biological activity $KR_t$ | | |
| --- | --- | --- | --- | --- |
| | Con- | cooling water containing a biocide of formula I | | |
| Time/Days | trol | Compound A | Compound B | Compound C |
| 3 | −0.4 | 0.75 | 0.51 | 3.18 |
| 7 | −0.61 | 0.53 | 0.63 | 3.78 |
| 11 | −0.78 | 0.09 | 1.03 | 3.42 |
| 14 | −0.79 | 0.17 | 1.37 | 3.42 |
| 21 | −1.24 | −0.62 | 1.35 | 2.12 | control: $KR_t$ = log KBE − log KBE ($K_o$)
cooling water with biocide: $KR_t$ = log KBE − log KBE (D)
KBE: number of units per ml that form colonies without treatment with the biocide at zero time (constant value)
KBE ($K_o$): number of units per ml that form colonies without treatment with the biocide
KBE (D): number of units per ml that form colonies after treatment with the biocide It follows from the Table that a single treatment of the cooling water with the compounds of the invention reduces the germ count over a period of 14 and 21 days respectively, whereas an increase in the germ count is observed in the untreated cooling water.

EXAMPLE 4

This test utilises a model swimming pool installed in the laboratory. The pool comprises:
(a) an aquarium (volume: 55 l)
(b) a pump (rate: 27 l/min) (the recirculation rate is reduced by a branch to 100 l/h)
(c) a sand filter (c. 1 l filter level).

The swimming pool is exposed to irradiation with daylight lamps, alternating between 14 hours light and 10 hours darkness. The water temperature is between 25° and 30° C.

The model swimming pool is inoculated weekly with 10 μl of 1+1+1 etc. mixed culture of overnight cultures of

| gram-positive bacteria | Bacillus subtilis | ATCC 6051 |
| --- | --- | --- |
| gram-negative bacteria | Pseudomonas aeruginosa | ATCC 10145 |
| | Enterobacter aerogenes | ATCC 13048 |
| | Alcaligenes denitrificans | ATCC 15173 |
| | Escherichia coli | ATCC 4157 |
| | Proteus vulgaris | ATCC 13315 |
| yeast | Saccharomyces cerevisiae | DSM 70449 |

Further, 10 ml of a 1 + 1 + 1 + etc. mixed culture of 14-day-old algae cultures of fresh water algae

| Cyanophyceae (blue algae) | Oscillatoria geminata | DSM 1459-8 |
| --- | --- | --- |
| | Nostoc. spec. | DSM 1453-7 |
| | Phormidium foveolarum | DSM B 1462-1 |
| | Anacystis nidulans | DSM L 1402-1 |
| Chlorophyceae (green algae) | Chlorella vulgaris | DSM 211-11 a |
| | Chlorella pyrenoidosa | DSM 211-3 m |
| | Scenedesmus spec. | DSM 276-7 |
| | Ulothrix subtilissima | DSM 384-1 |
| Xanthophyceae (brown chromatophores) | Tribonema aequale | DSM 880-1 | are added.

Initially, the concentration of compound B is 10 mg/l. After 1 week it is increased to 20 mg/l and maintained by further addition. The experiment is evaluated visually and by making a germ count on Caso-agar and algae-agar.

The following Table shows that 20 ppm of compound B keep the water virtually sterile. No algal growth can be observed over the entire 26 week duration of the experiment.

| | | Germ count/ml | |
| --- | --- | --- | --- |
| Time | Addition of compound B | before addition of bacteria and algae | 5 minutes after addition of bacteria and algae |
| 24 h before treatment | | $1.7 \times 10^4$ | |
| start | 10 mg/l | $5.7 \times 10^3$ | |
| 30 s after addition | | $3.9 \times 10^3$ | $1.4 \times 10^3$ |
| 1 week | 10 mg/l | $3.6 \times 10^3$ | |
| 30 s after addition | | $2.1 \times 10^3$ | $1.4 \times 10^3$ |
| 2 weeks | | $0.5 \times 10^1$ | |
| 30 s after addition | 10 mg/l | $2.3 \times 10^3$ | $2.7 \times 10^1$ |
| 3 weeks | | 0 | $3.8 \times 10^2$ |
| 4 weeks | | 0 | $3.6 \times 10^1$ |
| 5 weeks | | $0.5 \times 10^1$ | $5 \times 10^1$ |
| 6 weeks | | 0 | 0 |
| 7 weeks | | 0 | $4.5 \times 10^1$ |
| 8 weeks | | 0 | $8.6 \times 10^1$ |
| 9 weeks | 10 mg/l | $1 \times 10^1$ | $1 \times 10^1$ |
| 10 weeks | | $0.5 \times 10^1$ | 0 |
| 11 weeks | | $0.5 \times 10^1$ | $1 \times 10^1$ |
| 12 weeks | | $3.5 \times 10^1$ | $8.6 \times 10^1$ |
| 13 weeks | 5 mg/l | $0.5 \times 10^1$ | $1.5 \times 10^1$ |
| 14 weeks | | $0.5 \times 10^1$ | $1.5 \times 10^1$ |
| 15 weeks | | $1 \times 10^1$ | $0.5 \times 10^1$ |
| 16 weeks | | $1 \times 10^1$ | 0 |
| 17 weeks | | 0 | $1 \times 10^1$ |
| 18 weeks | 8 mg/l | $0.5 \times 10^1$ | $1 \times 10^1$ |
| 19 weeks | | $0.5 \times 10^1$ | $1 \times 10^1$ |
| 20 weeks | | 0 | $0.5 \times 10^1$ |
| 21 weeks | 5 mg/l | $1.5 \times 10^1$ | $0.5 \times 10^1$ |
| 22 weeks | | $0.5 \times 10^1$ | $0.5 \times 10^1$ |
| 23 weeks | | $0.5 \times 10^1$ | $0.5 \times 10^1$ |
| 24 weeks | 10 mg/l | $9 \times 10^1$ | $0.5 \times 10^1$ |
| 25 weeks | | 0 | 0 |
| 26 weeks | 5 mg/l | $1 \times 10^1$ | 0 |

EXAMPLE 5

A test swimming pool situated in a park and filled with local water has the following data:
volume: 8.5 m³
depth of water: 0.4 m
sand filter: c. 4×total volume circulation per day
situation: sun all day The experiment is carried out during the summer months.

The concentration of compound B is 20 ppm and is kept by further addition.

The test is evaluated visually and by making a germ count on Caso-agar and algae-agar.

Test Results

1. The algal count during the entire duration of the experiment is lower than $10^1$ germs/ml.

2. The swimming pool is kept virtually sterile by addition of 20 ppm of compound B and further addition to maintain this concentration.

3. The visual appearance of the water is excellent over the entire duration of the experiment.

What is claimed is:

1. A method of controlling micro-organisms in an aqueous system, comprising the step of adding to the aqueous system a microbiocidally effective amount of a polymeric quaternary ammonium salt of the formula I

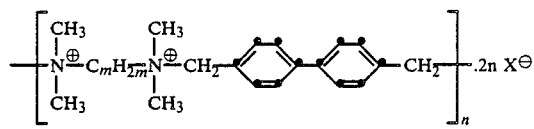 (I)

wherein n is an integer from 4 to 60, m is an integer from 2 to 20, and $X^{\ominus}$ is fluoride, chloride, bromide or iodide, said aqueous system being a cooling water circulation system, an industrial water tank or a swimming pool.

2. The method of claim 1, wherein m is 3 to 12.
3. The method of claim 1, wherein m is 6 and n is an integer from 10 to 15.
4. The method of claim 1, wherein n is 6 to 20.
5. The method of claim 1, wherein n is 10 to 15.
6. The method of claim 1, wherein $X^{\ominus}$ is chloride.

* * * * *